United States Patent [19]

Gourley, III

[11] Patent Number: 5,125,333
[45] Date of Patent: Jun. 30, 1992

[54] DEVICE FOR CRUSHING CANS AND CUTTING PLASTIC CONTAINERS

[76] Inventor: Russell C. Gourley, III, 6231 Penn Dr., Butler, Pa. 16001

[21] Appl. No.: 627,489

[22] Filed: Dec. 14, 1990

[51] Int. Cl.⁵ .......................... B30B 9/32; B30B 9/00
[52] U.S. Cl. ..................................... 100/94; 83/477.2; 83/478; 83/946; 100/102; 100/233; 100/293; 100/295; 100/902
[58] Field of Search ................. 100/94, 97, 98 R, 102, 100/103, 233, 293, 295, 902; 83/54, 946, 477.2, 478; 16/115

[56] References Cited

U.S. PATENT DOCUMENTS

| | | | |
|---|---|---|---|
| 104,192 | 6/1870 | Pagett | 100/293 X |
| 657,272 | 9/1900 | Lord | 100/98 R X |
| 1,764,634 | 6/1930 | Kummer | 83/478 |
| 2,109,057 | 2/1938 | Billker et al. | 83/478 X |
| 2,602,483 | 7/1952 | Graham | 100/94 |
| 3,060,979 | 10/1962 | Hanvin | 83/477.2 |
| 3,804,004 | 4/1974 | Krebs et al. | 100/902 X |
| 3,948,164 | 4/1976 | Pobuda et al. | 100/98 R |
| 4,418,594 | 12/1983 | Burns, Jr. | 100/902 X |
| 4,442,768 | 4/1984 | Bailey | 100/902 X |
| 4,561,351 | 12/1985 | Ader | 100/902 X |
| 4,884,502 | 12/1989 | Stacey, Jr. | 100/902 X |
| 4,885,965 | 12/1989 | Weissman | 83/477.2 X |

*Primary Examiner*—Harvey C. Hornsby
*Assistant Examiner*—Stephen F. Gerrity
*Attorney, Agent, or Firm*—George C. Atwell

[57] ABSTRACT

A device for crushing cans and cutting plastic containers to facilitate efficient, space-saving storage, compact disposal, and recycling of the material. The device includes a rigid base member adapted for placement on a level surface, a handle plate portion pivotally connected to the base member and adapted for crushing cans, a handle projecting outwardly from the handle plate portion and adpated for manual gripping, and a longitudinally-extending groove located on the base member. A pair of oppositely-disposed sculpted recesses for holding a can upright while the handle plate portion is pivoted downward for engaging and crushing the can are located adjacent the groove. A removable crushing plate is adapted for placement over the groove to support a can positioned lengthwise thereon for crushing by the handle plate portion. Projecting up through the groove is a rotary blade which is driven by a motor unit located within the base member. When the crushing plate is removed, a plastic container can be positioned and held lengthwise in the groove, whereupon it can be cut into small strips or pieces by manually turning the container upon the rotating blade. The device also includes a protective shield which is adapted for pivotal movement upward or downward to selectively cover and uncover the blade.

5 Claims, 4 Drawing Sheets

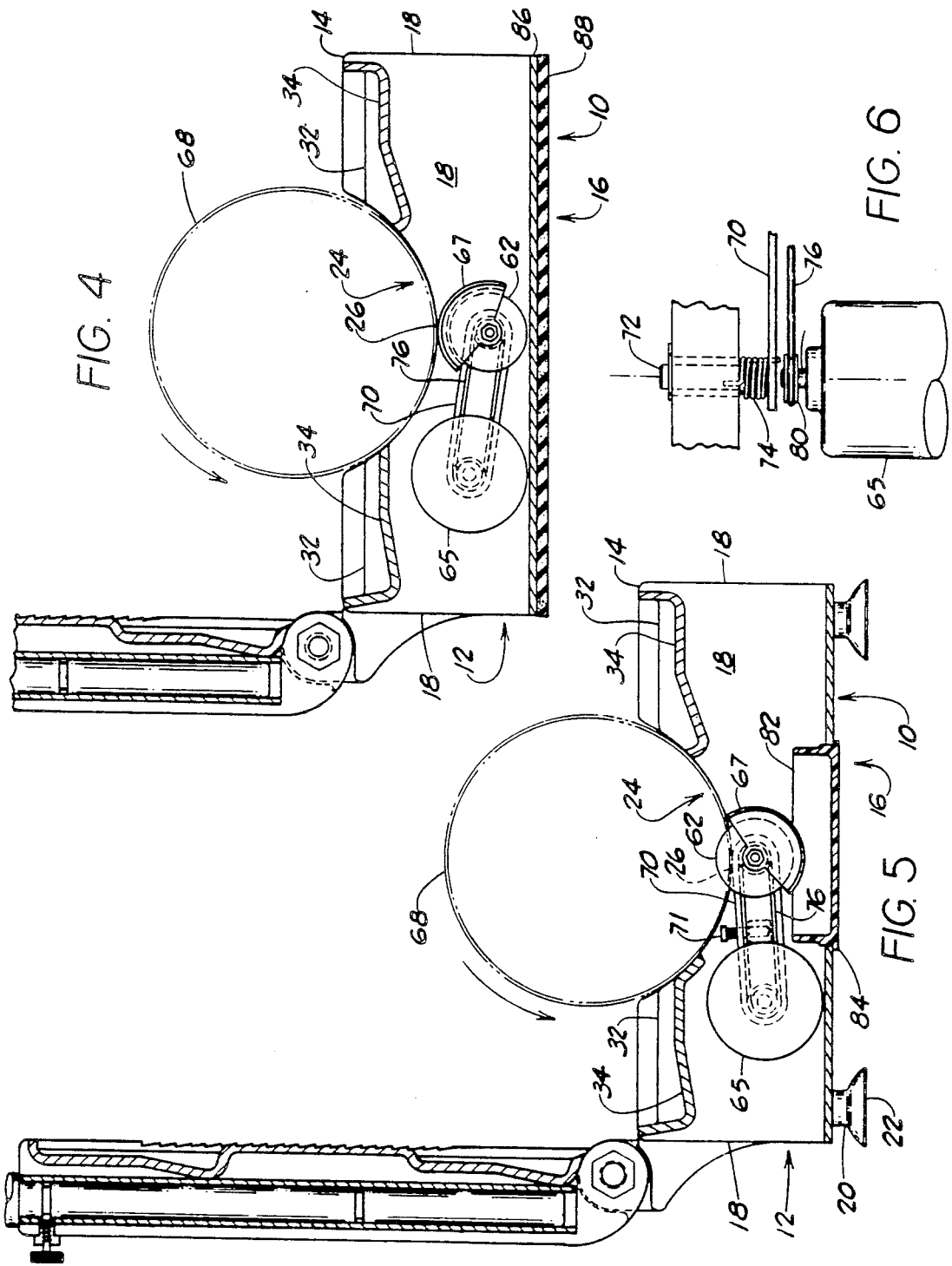

5,125,333

DEVICE FOR CRUSHING CANS AND CUTTING PLASTIC CONTAINERS

BACKGROUND OF THE INVENTION

This invention relates to devices for recycling can and containers, and more particularly relates to a device which can both crush aluminum and metal cans and cut plastic containers to facilitate their efficient storage, disposal and recycling.

With concern for the protection and preservation of the environment a prominent and vital issue in this country—as well as throughout the world—and recycling procedures being implemented in communities nationwide, various machines and devices, for both large-scale industrial use and also small-scale home use, have been invented for the collection, treatment, disposal, and recycling of the numerous waste materials, refuse, and by-products of contemporary industrial, technological society. Material that cannot be recycled must be disposed of by incineration or burial in landfills. Each method has its drawbacks: incineration discharges toxic chemicals and noisome fumes and gases into the air; landfills are visually repugnant and can be breeding grounds for various diseases even if properly managed. In addition, material dumped into the landfills can leak or spill heavy metals and carcinogenic chemicals into aquifers and nearby streams and lakes. Some of the material is not bio-degradable and, with available landfills rapidly filling up, the procedure whereby new landfills are approved is bureaucratically cumbersome and often vigorously opposed by communities located near such potential landfill sites. Nevertheless, for material that cannot be recycled, landfills will remain the final depository for much of society's waste, trash, and refuse.

Therefore, easy-to-operate devices that can help the typical homeowner and business operator dispose of and recycle material will aid in the conservation and reuse of our resources and enhance the protection of the environment. Among the most common consumer items found in every home and variously-sized aluminum and metal cans and plastic containers. If each homeowner in a given community discards these items into the trash uncompacted and uncompressed, the aggregate mass of the items deposited into that community's landfill will soon lead to its premature filling. However, a device which can compress and crush cans and slice containers into smaller pieces will reduce their "eco-mass" or volume and thereby, over the long term, considerably extend the life of the landfill. In addition, the recesses, folds, crevices, and hollow areas of uncompacted, uncompressed cans and containers, or partially compressed cans or containers, are fertile breeding places for the larvae of numerous egg-laying insects and for disease-transmitting bacteria, yeasts, and molds. Compaction and compression of cans and cutting containers to greatly reduce their original bulk or mass by a recycling device will reduce the available size and area or portions of such items and thus eliminate the parts or portions thereof that would collect water and refuse to serve as the breeding grounds for a variety of dangerous diseases. Also aluminum is one hundred percent recyclable and, therefore, it is vital that this resource should be re-used and not wasted.

A number of different devices have been employed to compact and crush cans and like items. One such device is illustrated by the Bailey patent, U.S. Pat. No. 4,442,768. The Bailey patent includes a base and a lever with a handle portion extending therefrom, the lever being pivotally connected to the base for permitting pivotal movement of the lever. The base has an inclined recess to receive one portion of a can while the lever has an annular recess to receive the other portion of the can. The can is placed in the base recess and a forceful downward pivoting movement of the handle causes the lever recess to engage the can and partially crush it. The can is then placed between base and lever rear pivot portions adjacent the pivoting connection for further crushing and compaction. p A more recent device for crushing metal containers is illustrated by the Stacey, Jr. patent, U.S. Pat. No. 4,884,502. The Stacey, Jr. patent includes a base member and an arm pivoted to the base member by a hinge means, the arm further supporting a compact member and a dent member. The dent member crushes the center portion of the container and the compact member and a lip member engage and crush one end of the container as part of a three-step operation.

The Burns, Jr. patent, U.S. Pat. No. 4,418,594, discloses a bottle saw system to cut uncontaminated portions from plastic bottles, specifically, the unlabeled upper portion or the base cup of the bottle before it is adhesively applied to the upper portion. The device includes a support system whereby the plastic bottles are held between moving belts and transported by a rotary saw blade for cutting off the contaminated portion. The upper portions of the bottles are flattened but not substantially reduced to a compressed or compact mass.

While the aforedescribed devices are adapted to crush cans or cut portions of a plastic bottle, there remains a need for a device that is adapted for crushing cans and cutting plastic containers to reduce their inherent bulk or "eco-mass" in order to achieve efficient storage, disposal, and recycling. In addition, a device or apparatus which can perform both of these functions, and yet is lightweight, durable, and easily stored on a kitchen counter or shelf, will be commercially marketable and desirable over devices with more limited functions.

SUMMARY OF THE INVENTION

The present invention comprehends a recycling device for crushing cans and cutting plastic containers to substantially reduce their original inherent bulk or aggregate mass and to facilitate space-saving storage of the materials and efficient disposal and recycling thereof.

The device of the present invention includes a sturdy, rigid base member having an upper side and an under side, for disposition on a level surface, such as a counter, table top, or kitchen floor. A plurality of spaced apart feet attached to the underside of the base member provides several inches of clearance for the base member above the level surface.

The base member includes a longitudinally-extending groove which is adapted for placing therein a plastic container, such as a two-liter soft drink bottle or a 64-ounce plastic container for bleach or laundry soap. The groove extends the full length of the base member. Also, the groove is generally centrally located on the base member and is concave-shaped and upwardly opening.

Projecting or protruding partially up through the groove is at least one rotary blade adapted for cutting variously-sized plastic containers. The blade projects through a slot on the groove and is driven by either a battery-powered or electrical drive motor. The blade is removable to facilitate replacement thereof when it has become dull and worn.

A handle plate portion is pivotally attached to the base member and is adapted for compressing and crushing a can by pivoting downward against the can positioned lengthwise or vertically upright, and pivoting upward and away from the can for removal thereof after crushing has occurred. The handle plate portion is attached to a sidewall of the base member such that, when the handle is fully pivoted downward, the handle plate portion is above and transversed to the groove and has a length and width such that the handle plate portion covers the base member when it is fully pivoted downward. Projecting outwardly from the handle plate portion is a handle which is adapted for manual gripping in order to pivot the handle plate portion upward or downward.

A crushing plate is provided for removable placement over the groove. When disposed in its operative position, the crushing plate covers the groove and a substantial portion of the upper side of the base member. The crushing plate has an upper plate surface adapted for placing lengthwise thereon a can to be crushed by pivoting the handle plate portion downward against the can to compress and crush the can against the upper plate surface. In order to effect maximum crushing and compaction, integrally formed on the handle plate portion is a can crushing handle plate which is adapted to contact and compress the can against the upper plate surface when the handle plate portion is fully pivoted downward. The can crushing handle plate is substantially the same length as the groove and, when disposed in its operative position, the can crushing handle plate is substantially covers the upper plate surface of the crushing plate, thereby permitting a can to be compressed and crushed by a single, forceful downward pivoting motion of the handle plate portion toward the upper plate surface.

The aforedescribed method is one way the recycling device of the present invention is able to crush and compact cans. Another method is to place the can (i.e., a 12-ounce or 16-ounce aluminum beer or soft drink can) upright in the one of a pair of oppositely-disposed sculpted recesses adjacent the groove and located on the upper side of the base member. With the crushing plate removed and the rotary blade protectively covered or shielded, the handle plate portion is forcefully pivoted downward so that one of a pair of spaced-apart crushing members adjacent the can crushing handle plate can engage and partially crush that can placed in one of the pair of sculpted recesses. The handle plate portion is then pivoted upward and the partially crushed can is removed and then placed upright in the other sculpted recess whereby a second downward pivoting movement of the handle plate portion causes the other crushing member to engage and complete the crushing of the can. The handle plate portion is pivoted upward again and the compressed can is then removed and stored for eventual disposal and recycling.

It is, therefore, an objective of the present invention to provide homeowners and business operators with a lightweight, manually portable, easy-to-operate device for crushing cans so that they can be compacted and compressed for easy, space-saving storage and for eventual disposal or recycling.

It is another objective of the present invention to provide for the cutting or slicing of plastic containers into numerous, easy-to-store, thin strips into greatly reduce their bulk or aggregate area and to facilitate their eventual disposal or recycling. In addition, the device of the present invention is adapted to either cut plastic containers or crush cans with minimal manipulation or rearrangement of the structural components or parts thereof, and without the need to employ handtools of any kind to convert the recycling device from can crushing to container cutting.

A still further objective of the present invention is to provide a device that is adapted for crushing cans and cutting plastic containers with minimal instruction for the user and which includes built-in safety features to protect the user.

BRIEF DESCRIPTION OF THE DRAWINGS

FIG. 4 is a vertical sectional view of the device first shown in FIG. 1 illustrating the initial container cutting disposition of the recycling device and with certain structural components removed for clarity;

FIG. 5 is a vertical sectional view of the device first shown in FIG. 4, further illustrating the cutting of the container; and FIG. 6 is an enlarged fragmentary view of the device first shown in FIG. 1, from a partial top plan perspective, illustrating structural components of the motor unit and pivoting arm.

DETAILED DESCRIPTION OF THE PREFERRED EMBODIMENT

Figure 1:
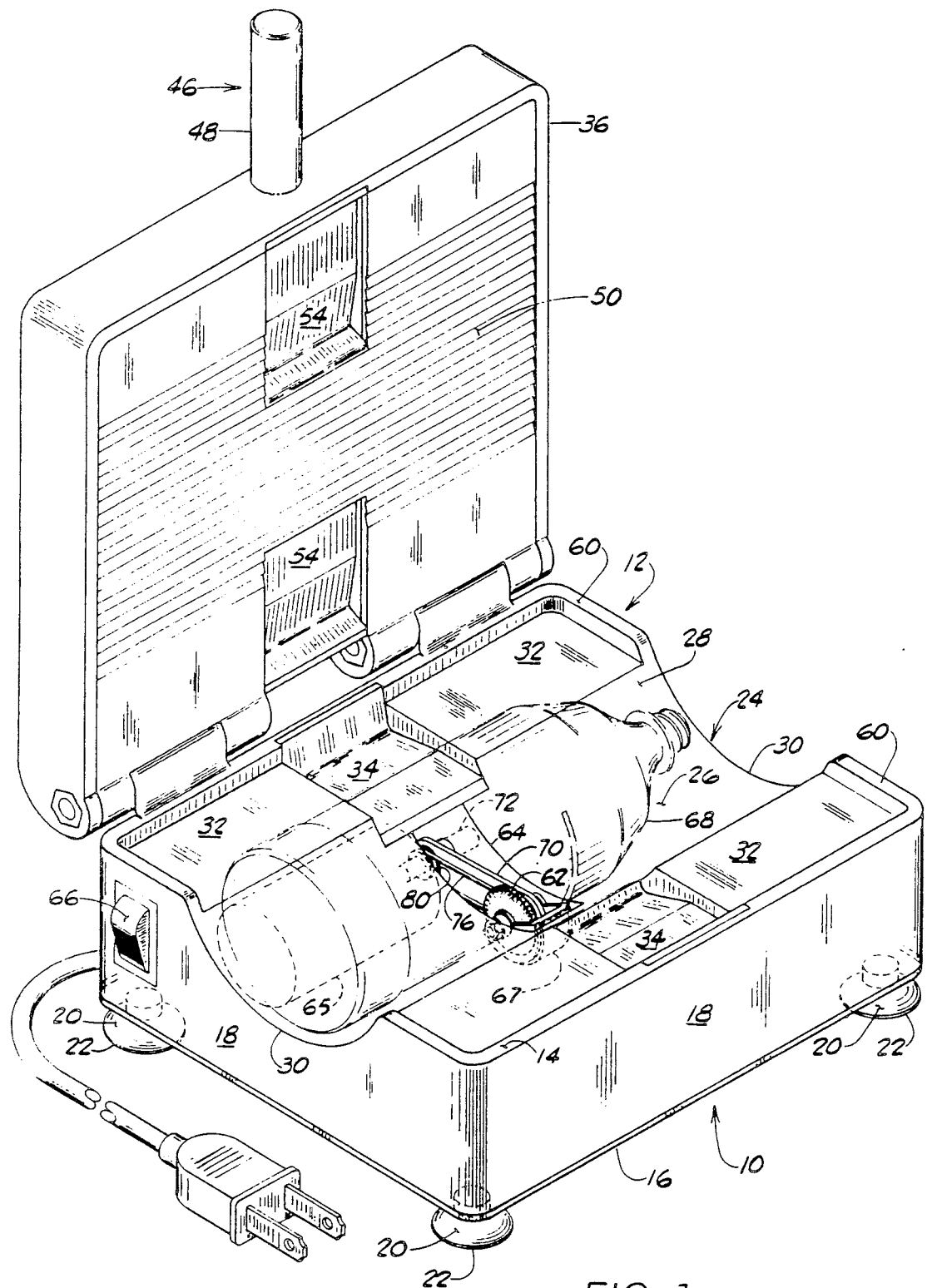
FIG. 1 is an isometric view of the preferred embodiment of the recycling device of the present invention.
Figure 2:
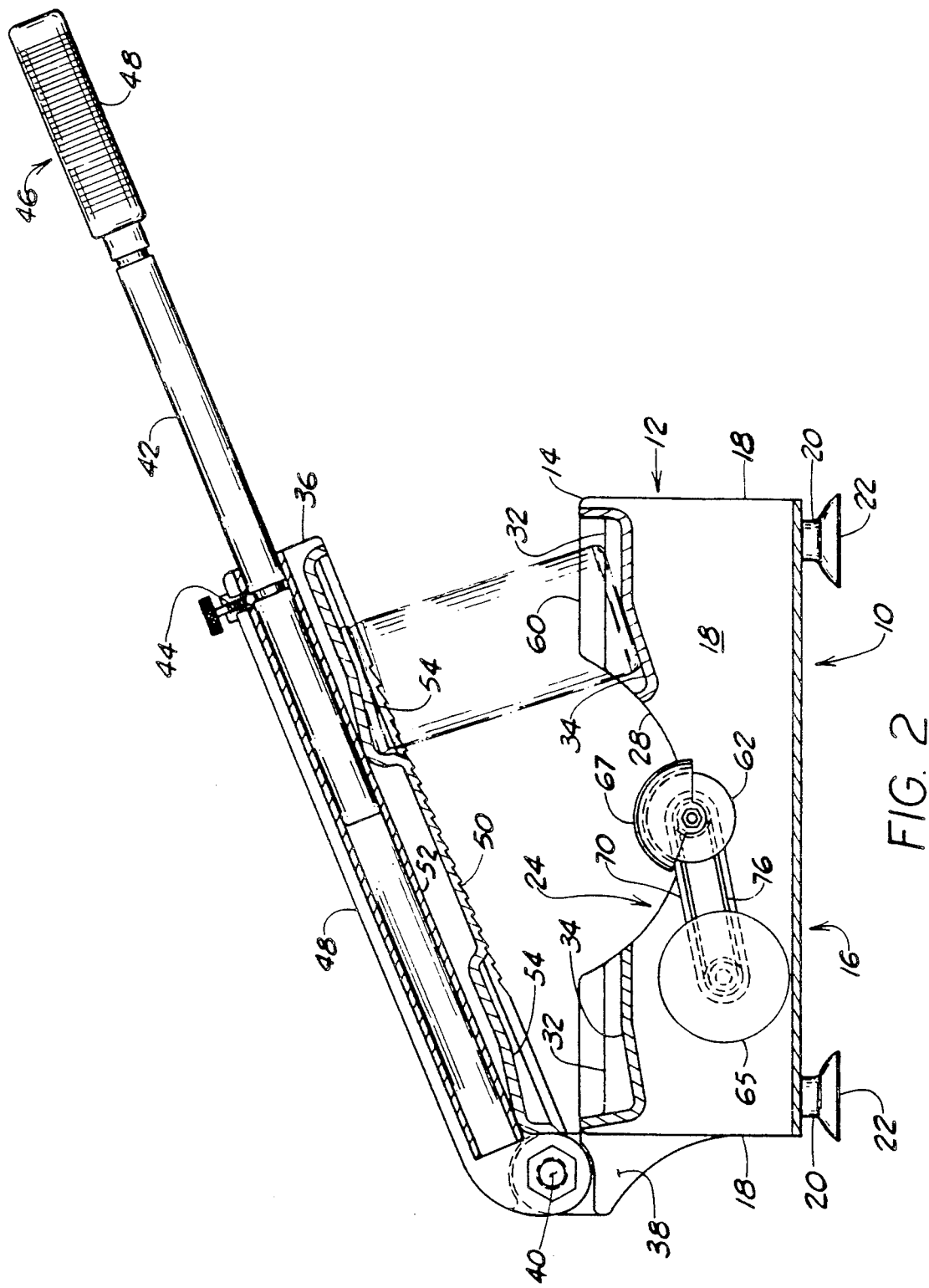
FIG. 2 is a vertical sectional view of the recycling device of the present invention first shown in FIG. 1.

Referring to the drawings, FIGS. 1 and 2 illustrate the preferred embodiment of a movable or portable recycling device 10. The movable or portable recycling device 10 of the present invention is adapted to crush cans either longitudinally or vertically, and also to cut plastic containers into small strips or pieces to facilitate efficient space-saving storage, disposal, and recycling of the aforementioned materials. The recycling device 10 is primarily intended for home use or for use in any office-type environment, and can be placed on a kitchen table, countertop, or floor surface. For proper and safe use, placement on a level surface is advisable. The numerous items which the recycling device 10 is adapted to crush or cut include such common household items as aluminum beer and pop cans, soup cans, juice cans, plastic milk containers, laundry detergent containers, plastic shampoo bottles, various cosmetic containers, many of which are plastic, and metal and aluminum fruit cans. As this description proceeds it will become apparent that the device 10 of the present invention can also be manufactured for large industrial purposes in order to cut and slice five-gallon plastic containers that hold bulk foodstuffs and hardware items, and to compact and crush metal and aluminum can considerably larger than alcohol and beverage cans.

The first step in the disposal and recycling of such aforementioned materials is for the homeowner or business operator to collect and temporarily store such material in or around his or her home. The uncompressed, uncompacted bulk of numerous aluminum and metal cans and plastic bottles and containers can hinder efficient, space-saving storage. The recycling device 10 is adapted to crush cans to a modicum of their original bulk or mass and to cut or slice plastic containers into very small strips, thus facilitating orderly and space-saving storage of such material until the material is transported to a recycling center or disposal site.

As illustrated in FIGS. 1 and 2, the recycling device 10 includes a base member 12. The base member 12 should be rigid and generally rectangular or square-shaped, and may be constructed or manufactured from metal or lightweight, durable, pre-formed plastic. The base member 12 is adapted for disposition on a level surface (i.e., kitchen floor, rigid table, countertop, or business office conference table) and includes an upper side 14, an under side 16, and a plurality of oppositely-disposed sidewalls 18. The base member 12 also includes a plurality of spaced-apart feet 20 attached to the under side 16 of the base member 12, that project downwardly from the base member 12. Each of the feet 20 includes a suction cup 22 for firm, non-sliding adherence to the level surfaces.

In addition, the feet 20 may include a height adjustment means for varying the clearance of the base member 12 from the level surface. Several different methods of adjusting the feet 20 are contemplated but none are shown in any of the figures. One method is to threadably insert the feet 20 into and up through the under side 16 of the base member 12, and, when adjustment is necessary, rotate the feet 20 clockwise or counterclockwise thus increasing or decreasing the clearance provided by the feet 20 for the base member 12 above the level surface. The threadable feet will be similar to those found on refrigerators and washing machines. Another method is to have the feet 20 include at least one telescoping member which can be retracted or extended, and locked and secured into position by a laterally-extending locking member. By extending the telescoping member attached to the feet 20, the clearance of the base member 12 from the level surface can be increased. By retracting the telescoping member into the feet 20, the clearance of the base member 12 from the level surface can be decreased.

Referring to FIGS. 1 through 5, a longitudinally-extending groove 24 is located on the upper side 14 of the base member 12. The longitudinally-extending groove 24 is adapted to receive and support on its upwardly-opening, concave-shaped surface a plastic container to be cut into small, easily storable and recyclable strips or slices. The groove 24 also includes a middle portion 26 and a pair of oppositely-disposed side portions 28, all of which are co-equal in length with the groove 24, and which further define the upwardly-opening, concave-shaped surface. The groove 24 runs the full length of the base member 12 and registers at oppositely-disposed groove ends 30 with adjacent sidewalls 18 of the base member 12. FIGS. 4 and 5 illustrate a plastic container placed or positioned lengthwise in the groove.

Some plastic containers will only fill the middle portion 26 of the groove 24 but, as is illustrated in FIGS. 4 and 5, plastic containers are placed lengthwise within the groove 24 will be contiguous with the middle portion 26 and, for most plastic containers, contiguous with the oppositely-disposed side portions 28 of the groove 24.

As illustrated in FIGS. 1 through 5, the base member 12 includes a pair of oppositely-disposed, integrally-formed, longitudinally-extending ledges 32 located on the upper side 14 of the base member 12 and adjacent the side portions 28 of the groove 24. The ledges 32 extend substantially the full length of the base member 12 but are recessed within the upper side 14 of the base member 12 so that the highest point on the sidewalls 18 projects a small distance above the ledge 32. The purpose of each ledge 32 shall be more fully described hereinafter.

As illustrated in FIGS. 1 through 5, generally centrally located on the ledges 32 and integrally formed therefrom are a pair of oppositely-disposed sculpted recesses 34. Each recess 34 is adapted to receive and maintain either end of a can (preferably aluminum) in an upright, generally vertical position for crushing. The recesses 34 may be square, circular, or rectangular-shaped so long as they can accommodate a typical 12-ounce or 16-ounce aluminum or metal can. In the preferred embodiment of the present invention, the recesses 34 are square-shaped. As illustrated in FIGS. 2, 4, and 5, each recess 34 is adjacent the upper portion 28 of the groove 24 and is integrally formed from each ledge 32. The flat surface of each ledge 32 is broken or interrupted by each sculpted recess 34, and each recess 34 forms a depression on each ledge 32. Moreover, each recess 34 has sufficient depth to maintain and hold the can upright therein to prevent the can from slipping or sliding out of the recess 34 and into the groove 24 during crushing. Also, each recess 34 has a level portion and a sloping portion to facilitate vertically upright can crushing. As will be more fully described hereinafter, the sloping portion of each recess 34 allows the can to be more naturally deformed during can crushing.

As illustrated in FIGS. 1 through 5, a handle plate portion 36 is pivotally attached to the base member 12 and adapted for pivotal movement upward or downward transverse to the groove 24. A hinging member 38 attaches the handle plate portion 36 to the base member 12 and includes a pivot axle 40 and a plurality of lugs for allowing the pivoting movement, either upward or downward, of the handle plate portion 36 for can crushing, the hinging member 38 is located adjacent to but offset from the base member 12 and the pivot axle 40 is enclosed within the hinging member 38. However, the location of the pivot axle 40 is above all the sidewalls 18 and adjacent to one of the sidewalls 18. If the pivot axle 40 were level with the sidewalls 18, the handle plate portion 36 would be unable to pivot downward far enough to sufficiently crush the can positioned either lengthwise or vertical in the sculpted recesses 34. When fully pivoted downward, he handle plate portion 36 spans and is transverse to the groove 24 and the base member 12. As shall be hereinafter more fully described, the handle plate portion 36 is adapted to completely compact and crush cans that are placed upright in the recesses 34 or horizontally placed or positioned in the groove 24.

Figure 3:
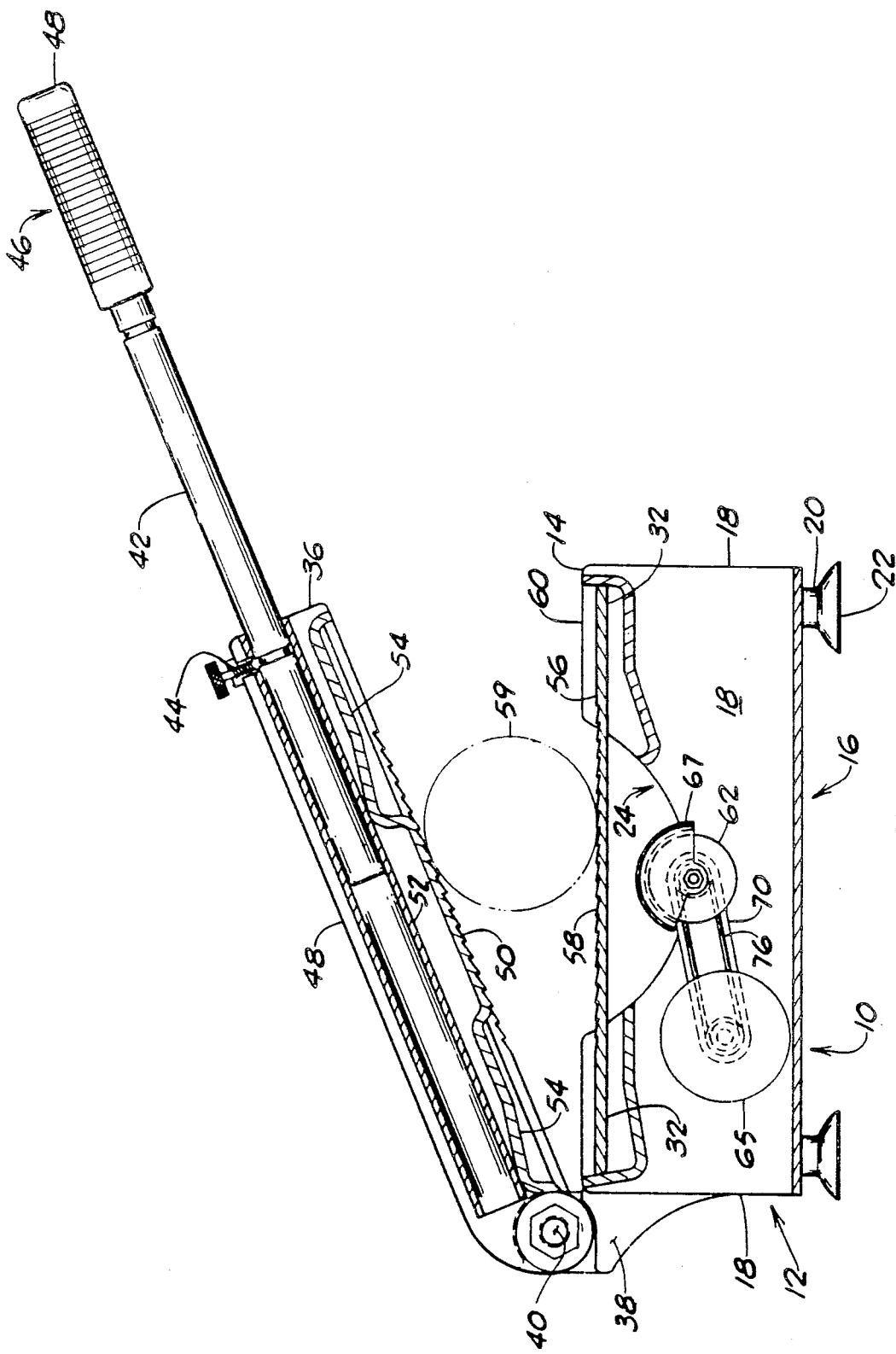
FIG. 3 is a vertical sectional view of the device first shown in FIG. 1 disposed in its longitudinal can crushing position.

Referring to FIGS. 2 and 3, a telescoping lever arm 42 projects outwardly from the handle plate portion 36 and is adapted for selective extension and retraction to provide maximum downward crushing pressure for the user. A detent spring 44 is laterally mounted to the side of the telescoping lever arm 42 and is adapted for manual retraction or extension. The telescoping lever arm 42 includes at least a pair of axially aligned lever arm portions (not shown) which partly overlap and slidably register against one another. Each lever arm portion has a plurality of spaced-apart holes which can be aligned with each other and with the spring 44. To retract or extend the telescoping lever arm 42, the detent spring 44 is manually pulled away from the lever arm portions and the user adjusts the lever arm portions until the appropriate length is achieved. The detent spring 44 is then manually released and inserted into the axially-aligned holes of each lever arm portion, thus securing the lever arm portions at the determined length.

As illustrated in FIGS. 1, 2, and 3, a handle 46 projects or protrudes out of the handle plate portion 36 and is attached to the distal end of the telescoping lever arm 42. The handle 46 is adapted to pivot upward and downward as a result of the user gripping and manually moving the handle 46 toward or away from the base member 12. The handle 46 includes a handle grip 48, preferably made of soft or foam rubber, to facilitate comfortable but firm gripping.

The handle plate portion 36 includes a can crushing handle plate 50 adapted to contact, engage, and crush horizontally positioned cans in the manner more fully described hereinafter. The handle plate 50 can be either integrally formed from the handle plate portion 36 or it can be attached or fastened to the handle plate portion 36. When the handle plate portion 36 is fully pivoted downward, the handle plate 50 adjacently faces or opposes the groove 24. As illustrated in FIGS. 2 and 3, the preferred embodiment of the recycling device 10 contemplates that the handle plate portion 36 will be integrally formed from one piece of pre-formed or extruded plastic and that the handle plate 50 will include a slip-resistant surface with a metal back in or support 52.

As illustrated in FIGS. 1, 2, and 3, a pair of oppositely-disposed recessed crushing members 52 are located adjustment the can crushing handle plate 50 and integrally formed from the handle plate portion 36. The crushing members 54 are adapted to engage and stabilize either end of the upright can when the handle plate portion 36 is pivoted downward against the upright can for crushing, while the other end of the upright can is placed within either one of the recesses 34 and maintained in an upright position. When the handle plate portion 36 is fully pivoted downward toward the base member 12, the handle plate 50 will be generally equal in length to and will substantially cover the groove 24, and the crushing members 54 will each be in axial alignment with one of the recesses 34. The crushing members 54 also include a level portion and a sloping portion that facilitate a more natural deformation of the can as it is being crushed.

To more specifically locate the handle plate 50 and the crushing members 54 in relation to the groove 24 and the recesses 34, the handle plate 50 and the crushing members 54 are formed from the square or rectangular-shaped handle plate portion 36. When fully pivoted downward to a position adjacent the groove 24, the handle plate portion 36 will be of the same general length as the groove 24, and the handle plate 50, which is integrally formed from the handle plate portion 36, will be co-equal in length to and cover the groove 24. The handle plate portion 36 will have the same dimensional relationship to the base member 12 as the dimensions of the two hinged parts that comprise a waffle iron.

As illustrated in FIG. 3, the recycling device 10 of the present invention includes a flat elongated crushing plate 56 which is adapted for removable placement over the groove 24 and adjacent the upper side 14 of the base member 12. When disposed in its operative position, the crushing plate 56 covers the groove 24 and is further defined by having a slip-resistant upper plate surface 58 which hinders a horizontally-positioned can 59 from sliding off the crushing plate 56 while it is being crushed. In addition, the upper plate surface 58 includes at least one circular or square-shaped recess (not shown) formed thereon and adapted to upwardly face the can crushing handle plate 50. This recess is adapted for receiving either end of the can and maintaining it in an upright position for crushing by the handle plate 50 as a result of pivoting the handle plate portion 36 downward toward the base member 12.

More specifically, as illustrated in FIG. 3, the crushing plate 56 is adapted for removable placement on each longitudinally-extending ledge 32, and each ledge 32 is adapted for receiving and supporting a portion of the crushing plate 56. To further maintain the crushing plate 56 when disposed in its operative position of contiguous placement on each ledge 32 and over the groove 24, the base member 12 includes a plurality of crushing plate side retainers 60. As shown in FIG. 1, one side retainer 60 is located at each end of both ledges 32. The side retainers 60 project above the ledges 32 and many be level with or extend slightly above the crushing plate 56 when the crushing plate 56 is disposed in its operative position. Also, the side retainers 60 form part of each sidewall 18 of the base member 12 that are adjacent the groove ends 30. The side retainers 60 prevent the crushing plate 56 from sliding off the base member 12 if the recycling device 10 is tipped to one side or the other while being moved to a different location or being placed in some storage location. Preferably, when moving the recycling device 10, the crushing plate 56 should be disposed in its operative position of contiguous placement on the ledges 32 and over the groove 24, and the handle plate portion 36 should be pivoted as far down as possible immediately adjacent and above the crushing plate 56. Thus, the device 10 can be moved and the crushing plate 56 will be prevented from falling off the device.

As illustrated in FIGS. 1 through 5, at least one blade 62 protrudes or projects vertically up into the groove 24 for cutting the container when the container is placed lengthwise in the groove 24. The blade 62 is rotary abrasive blade adapted for durability, longevity, and cutting containers constructed of various material and varying thicknesses. The majority of containers placed lengthwise in the groove 24 for cutting will be of various plastic textures, but it is conceivable that the rotary abrasive blade 62 will be capable of cutting thin metal and, certainly, foam and cardboard-type containers. In addition, a steel carbide toothed blade may be used. The rotary abrasive blade 62 protrudes up through a slot 64 that is centrally located in the groove 24. It is conceivable that a vertically-reciprocating jig blade may also be used; however, it is believed a jig blade would lack the durability of a rotary abrasive blade and would also be prone to breaking or snapping if a container having a relatively hard plastic surface was improperly pressed down upon such a blade.

In addition, in an alternate embodiment (not shown) it is contemplated that at least one, and perhaps a plurality, of stationary blades may be secured or attached at the middle portion 26 of the groove 24, and spaced therealong the longitudinal extension of the groove 24. In this alternate embodiment, the container would be placed lengthwise in the groove 24 and pressed down upon the series of spaced-apart stationary blades until the side of the container was perforated or pierced. The container would then be turned 360° several times about its axis until each blade had circumferentially cut the side of the container.

However, in the preferred embodiment of the recycling device 10, the rotary abrasive blade 62 will be connected to a motor means for selective rotation when the container is placed lengthwise in the groove 24 and contiguous to and in contact with the blade 62 in a manner hereinafter more fully described. As illustrated in FIGS. 1 through 5, the motor means is a motor unit 65 including a battery-powered or electrical drive motor of the standard reduction transformer type. A main on/off switch 66 regulates power to the drive motor of the motor unit 65. Although not shown in FIGS. 1 through 5, it is contemplated that the motor unit may have the ability to snap in and snap out by means of electrical contacts attached to the base member. As illustrated in FIGS. 1 through 5, the motor unit 65 is located within the base member 12 and may be accessed by removing either a portion hingeably-attached to the under side 16 of the base member 12 (not shown), a snap-on removably-attachable plate located on the under side 16 of the base member 12 (not shown), or a removably attachable plate located on one of the sidewalls 18 adjacent the motor unit 65 (not shown). Whether access to the motor unit 65 is by the hingeably-attached portion, the snap-on plate, or the sidewall plate, the most important factor is that the motor unit 65, especially during operation, should be securably concealed within the base member 12 for user and operating safety. It should be noted that when the blade 62 is disposed in its operative position of cutting and slicing the container, the crushing plate 56 must, obviously, be removed.

An exposed blade on a product designed for home use in certain to attract the interest and attention of young children; therefore, liability on he part of producers and manufactures will be incurred and action by such governmental agencies as the Consumer Product Safety Commission will likely result. Because the recycling device 10 is intended for use mainly in the home and in the business environment, the recycling device 10 includes a safety guard means for selectively covering and uncovering the blade 62.

More specifically, the safety guard means of the device 10 includes a protective shield 67 adapted to cover that part of the blade 62 that protrudes or projects up through the slot 64 and into the groove 24 when it its operative position, as illustrated in FIGS. 2 and 3. The protective shield 67 has a sponge rubber coating on its outwardly exposed surface and is adapted to pivot by a spring tensioning method (more fully described hereinafter) on a horizontal pin (not shown) to which the blade 62 is also attached.

As illustrated in FIG. 4, when a container 68 is placed within the groove 24 for cutting, a portion of the container's surface contacts the sponge rubber coating of the shield 67. The sponge rubber coating is resistive to objects that come in contact with the coating, and, as a portion of the container 68 contacts the sponge rubber coating, the container 68 is rotated as indicated by the directional arrow. Because of the friction at the point of contact between the container 68 and the sponge rubber coating of the shield 67, the rotation of the container 68 causes the shield 67 to pivot downward into the slot 64 thus uncovering the blade 62 as illustrated in FIG. 5 and more fully described hereinafter.

An additional safety device for enhancing the safety of the user is to provide a second safety switch (not shown) which can be contacted by the downward pivot of the shield 67, thus actuating the blade 62. The second safety switch could be a toggle switch or press-actuated switch; in either embodiment, the second safety switch would be located within the base member 12 and adjacent the blade 62 and the shield 67. In operation and with the main switch 66 turned on, the container 68 is placed in the groove 24 with a portion of the container's surface contiguous to the shield 67. As the container 68 is rotated against the sponge coating of the shield 67, the shield 67 is pivoted downward into the slot 64 to uncover the blade 62.

This downward pivoting motion causes the shield 67 to physically contact or impinge upon the second safety switch. When this contact occurs, the second safety switch is actuated and the blade 62 starts to turn. The second safety switch is designed to actuate the blade 62 prior to actual contract with the container 68, thus preventing the container 68 from being forced down upon the blade 62 while it is stationary. Consequently, the blade 62 has acquired some rotational momentum before it impinges and starts to cut the container 68. With the addition of the second safety switch, activating the motor unit 65 by turning on the main switch 66 will automatically start rotation of the blade 62, thus further protecting against accident and injury.

As illustrated in FIGS. 4, 5, and 6, the blade 62 is connected to an elongated pivoting arm 70. The pivoting arm 70 is connected to the motor unit 65 at one end by a stub shaft 72 which horizontally and laterally extends out from the motor unit 65. The other end of the pivoting arm 70 is attached to a horizontally-extending pin (not shown), upon which the blade 62 is fixed for removable attachment. This allows for replacement of the blade 62 when it has become worn, dull, chipped, or broken through extensive use. The spring tensioning of the pivoting arm 70 allows downward or upward pivoting motion in a vertical plane of the pivoting arm 70. The spring tensioning is achieved by a coiled torsion spring 74 which circumferentially encompasses the horizontally-extending stub shaft 72. A second torsion spring (not shown) is attached to the pin and to the shield 67 to permit the shield 67 to pivot upward or downward as it is contiguously contacted by the container 68. Furthermore, a belt 76, such as an O-ring belt or a bead chain, is stretched around the pin and a drive shaft 78 which projects out from the motor unit 65 and is in axial alignment with the stub shaft 72. The belt 76 is adapted for translating rotary movement to the blade 62 when the drive shaft 78 is rotatably actuated by the drive motor of the motor unit 65. The belt 76 achieves its tensioning by being stretched around and attached to a drive pulley 80 mounted on the drive shaft 78 and a blade pulley (not shown) mounted to the pin. It should also be noted that a straight drive or gear drive system may be used to translate rotary motion to the blade.

When the recycling device 10 of the present invention is disposed in its operative position for container cutting as illustrated in FIGS. 4 and 5, the container 68 is placed lengthwise in the groove 24 and the container 68 presses down upon the shield 67 which is spring tension-mounted to the pin by the second torsion spring. In order to uncover the blade 62, the container 68 is rotated and, as the container 68 rotates, it is in contact with the sponge rubber coating on the shield 67. As a consequence of the container 68 contacting, pressing down upon, and being rotated upon the shield 67, the pivoting arm 70 pivots downward toward the under side 16 of the base member 72. As the shield 67 is being rotated out of the way and down into the slot 64, the pivoting arm 70 then pivots upward and the blade 62 pivots upward and comes in contact with a portion of the surface of and cuts through the container 68, as illustrated in FIG. 5. This pivoting motion of the pivoting arm 70 is facilitated by the coiled torsion spring 74 which is circumferentially wrapped around the stub shaft 72 and attached to the pivoting arm 70, and the second torsion spring which is circumferentially wrapped around the pin and attached to the shield 67.

Even with the shield 67, caution must be exercised by the user when the blade 62 is running. Generally, the container 68 is cut inhalf by the blade 62 while the user very carefully holds the container 68 at either end and rotates the container 68 360° upon the rapidly rotating blade. Thereafter, the user places one of the half portions in contact with the blade 62 as aforedescribed and this portion of the container 68 is then cut in half. The user should continue halving the portions of the container 68 mindful of the distance his or her fingers are from the blade 62. When the user no longer feels that cut portions of the container 68 can be held or rotated without bringing his or her fingers in close and dangerous proximity to the blade 62, and the portion of the container 68 being cut cannot maintain a fairly firm shape, then cutting and slicing of the container 68 can be terminated. The last-cut portion of the container 68 can be lifted off the blade 62 and the shield 67 will then pivot upward and around to cover the blade 62. Lifting the last portion of the container 68 off of the blade 62 also causes the pivoting arm 70 to fully pivot upward to the position illustrated in FIG. 3 and causes the rotatably mounted shield 67 to rotate up through the slot 64 to cover the blade 62, as also illustrated in FIG. 3.

As shown in FIG. 5, an arm adjustment means is provided to adjust the height to the side of the pivoting arm 70 opposite the drive shaft 78 and the drive pulley 80, and an adjustment screw 71 is mounted with the housing. By rotating the screw 71 clockwise or counterclockwise, the height or depth of the pivot of the arm 70 within the slot 64 can be regulated. Adjusting the screw 71 also determines how far above the surface of the groove 24 the blade 62 can protrude.

FIG. 5 illustrates a removably attachable pan 82 located on the under side 16 of the base member 12 and beneath the blade 62 and the slot 64 through which the blade 62 protrudes into the groove 24. With continual use of the recycling device 10, scraps and fragments from container cutting will accumulate around the area of the blade 62, shield 67, and slot 64, and will eventually hinder the operation of the blade 62 to prevent this from occurring, the pan 82 will collect scraps and fragments of cut plastic that have fallen through the slot 64. The pan 82 should have sufficient clearance from the level surface and the pan 82 may have a peripherally-extending flange 84 through which screws or nuts can be threadably inserted for securing the pan 82 to the under side 16 of the base member 12. Periodically, the pan 82 can be unscrewed from the under side 16 of the base member 12 and the refuse material which has collected in the pan 82 can be thrown away or temporarily stored for recycling if so desired. Then the pan 82 can be reattached to the under side 16 of the base member 12 for further use. A simpler means for attached the pan 82 to the under side 16 of the base member 12 is to adapt the pan 82 to be removably by a snap-on means. The snap-on means may be prongs or flanges that snap into grooves on the under side 16 of the base member 12.

In an alternate embodiment of the device of the present invention, which is not shown in any of the figures, the structural components revealed in the preferred embodiment will be the same except for the positioning of the handle plate portion 36. In the alternate embodiment of the invention, the handle plate portion 36 will be pivotally attached to the base member 12 and adapted to selectively pivot downward against the can to facilitate crushing, and selectively pivot upward away from the can to permit removal of the can after it has been crushed. However, in the alternate embodiment, the pivotal attachment of the handle plate portion 36 to the base member 12 will be at either of the groove ends 30 of the longitudinally-extending groove 24. In contrast to FIG. 1, which shows the handle plate portion 36 pivotally attached to the base member 12 at one sidewall 18 and adapted to transversely cover to the groove 24 when pivoted downward, in the alternate embodiment, the handle plate portion 36 will be moved 90° to either side so that the handle plate portion 36 is attached to either sidewall 18 that registers with either of the groove ends 30. When the handle plate portion 36 is fully pivoted downward toward the groove 24 in the alternate embodiment, the handle plate portion 36 will be parallel to the longitudinally-extending ledges 32 and the crushing plate 56. As in the preferred embodiment, the crushing plate 56 in the alternate embodiment will include the slip-resistant upper crushing surface 58 adapted to support a can placed lengthwise or horizontally thereon for crushing.

Furthermore, in the alternate embodiment, the crushing plate 56 should include at least one square or circular recess (not shown in the figure) on the upper crushing surface 58 adapted to receive and maintain the can in an upright vertical position while the handle plate portion 36 is being pivoted downward against the can for crushing. When the handle plate portion 36 is fully pivoted downward, at least one of the crushing members 54 integrally formed on the handle plate portion 36 will be in generally vertical alignment with the recess located on the upper crushing surface 58 of the crushing plate 56. In addition, the recess should be formed into the upper crushing surface 58 to a depth that will maintain the can in a vertically upright position but will not sufficiently weaken the crushing plate 56 when the handle plate portion 36 is forcefully pivoted downward against either end of the can. In the alternate embodiment, the can crushing handle plate 50 will still be able to crush a can that is placed lengthwise on the upper crushing surface 58 but it may require more than one attempt to fully compact and crush the can.

It should be noted that, although FIG. 2 illustrates the recycling device 10 elevated from the level surface by the plurality of feet 20 with suction cups 22 adhering to the level surface, FIG. 4 reveals the recycling device 10 devoid of the feet. Instead, FIG. 4, illustrates a bottom metal plate 86 attached to the under side 16 of the base member 12. Contiguously attached to and having the same dimensions as the metal plate 86 is a non-skid rubber pad 88. The pad 88 permits the device 10, as shown in FIG. 4, to be placed directly on the level surface and inhibits the device 10, when disposed in its operative position, from sliding or slipping across the level surface, such as a kitchen floor.

It should be understood that certain changes may be made in the above-described movable recycling device without departing from the spirit and scope of the invention herein involved. It is intended that all matter contained in the above description or shown in the accompanying drawings shall be interpreted in the illustrative and not the limiting sense.

I claim:

1. A portable recycling device for supporting thereon variously-sized cans and plastic containers for crushing and cutting, comprising:
   a rigid base member for disposition on a level surface, the base member having an upper side and an oppositely-disposed under side;
   a longitudinally-extending groove located on the upper side of the base member for receiving and supporting therein the container to be cut, the groove extending the length of the base member and terminating at a pair of of oppositely-disposed groove ends;
   a pair of oppositely-disposed sculpted recesses located on the upper side of the base member adjacent the groove, the sculpted recesses adapted for receiving and maintaining the can in an upright position for crushing;
   a handle plate portion pivotally attached to the base member and adapted to pivot downward to crush the can maintained in one of the sculpted recesses and to pivot upward to permit removal of the crushed can therefrom;
   a handle projecting outwardly from the handle plate portion, the handle adapted for manual gripping to pivot the handle plate portion upward and downward;
   a crushing plate for removable placement over the groove, the crushing plate adapted to support the can placed either upright or horizontally thereon for crushing by the handle plate portion;
   a motor unit located within the base member;
   a pivoting arm connected to the motor unit, the pivoting arm adapted for upward and downward pivoting movement in a vertical plane as a consequence of the container being placed in the groove for cutting; and
   a blade connected to the pivoting arm and driven by the motor unit, the blade adapted for selective rotation in order to cut the container placed in the groove.

2. The device of claim 11 wherein the crushing plate includes a slip-resistant upper crushing surface which is adapted for supporting the can placed lengthwise thereon for crushing by the handle plate portion, the slip-resistant surface substantially preventing the can from sliding off the crushing plate while the can is being crushed by the handle plate portion.

3. The device of claim 2 wherein the crushing plate includes at least one circular recess located on the upper crushing surface and adapted for receiving and maintaining the can in an upright position while the handle plate portion is being pivoted downward against the can for crushing thereof.

4. The device of claim 1 further comprising a can crushing handle plate attached to the handle plate portion and having substantially the same length as the handle plate portion, the can crushing handle plate adapted to contact and crush the can horizontally positioned on the crushing plate.

5. The device of claim 4 wherein the can crushing handle plate includes a pair of oppositely-disposed, recessed crushing members formed thereon for engaging and stabilizing the can placed upright in one of the sculpted recesses during crushing by the handle plate portion.

* * * * *